(12) United States Patent
Chen et al.

(10) Patent No.: US 9,128,874 B2
(45) Date of Patent: Sep. 8, 2015

(54) METHOD OF USING MICROPHONES TO MEASURE PARTICLE VELOCITY

(71) Applicant: National Tsing Hua University, Hsinchu (TW)

(72) Inventors: Ching-Cheng Chen, Hsinchu (TW); Mingsian R. Bai, Hsinchu (TW); Shen-Wei Juan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 501 days.

(21) Appl. No.: 13/679,193

(22) Filed: Nov. 16, 2012

(65) Prior Publication Data

US 2014/0052406 A1    Feb. 20, 2014

(30) Foreign Application Priority Data

Aug. 15, 2012 (TW) .............................. 101129448 A

(51) Int. Cl.
| | | |
|---|---|---|
| G01P 11/00 | (2006.01) | |
| G06F 17/13 | (2006.01) | |
| H04R 1/40 | (2006.01) | |
| G06F 17/40 | (2006.01) | |

(52) U.S. Cl.
CPC ................ *G06F 17/13* (2013.01); *H04R 1/406* (2013.01); *H04R 2201/003* (2013.01); *H04R 2201/403* (2013.01)

(58) Field of Classification Search
CPC ... H04R 3/005; H04R 2201/403; H04R 1/326
See application file for complete search history.

(56) References Cited

U.S. PATENT DOCUMENTS 7,035,416 B2 * 4/2006 Matsuo ............................ 381/92
2011/0106486 A1 * 5/2011 Hanyu ........................... 702/138

OTHER PUBLICATIONS

DeBree, "The Microflown: An Acoustic Particle Velocity Sensor," Acoustics Australia, vol. 31, No. 3, pp. 91-94 (Dec. 2003).
Kreyszig, Advanced Engineering Mathematics, John Wiley & Sons, pp. 798-801 (2006).
Sarkissian, "Method of Superposition Applied to a Patch Near-Field Acoustical Holography," J. Acoust. Soc. Am., vol. 118, pp. 671-678 (2005).
Gomes et al., "On the Applicability of the Spherical Wave Expansion with a Single Origin for Near-Field Acoustical Holography," J. Acost. Soc. Am., vol. 125, pp. 1529-1537 (2009).

(Continued)

*Primary Examiner* — Phuong Huynh
(74) *Attorney, Agent, or Firm* — Muncy, Geissler, Olds & Lowe, P.C.

(57) ABSTRACT

A method of using microphones to measure a particle velocity comprises steps: arranging a sound source, a first microphone and a second microphone in a space, wherein the first microphone is arranged between the sound source and second microphone, and wherein the first microphone is located at a first position and the second microphone is located at a second position more far away from the sound source than the first position; using the first and second microphones to measure the sound source and obtain first and second acoustic pressures respectively; using the first and second positions and an equivalent source method to establish a free-space Green's function, and using the first and second acoustic pressures and the equivalent source method to establish an acoustic pressure function; and using the free-space Green's function and acoustic pressure function to predict state space of sound amplitude and then obtain a particle velocity.

6 Claims, 6 Drawing Sheets

(56) References Cited

OTHER PUBLICATIONS

Nelson et al., "Estimation of Acoustic Source Strength by Inverse Methods: Part I, Conditioning of the Inverse Problem," J. Sound Vib., vol. 233, pp. 643-668 (2000).

Yoon et al., "Estimation of Acoustic Source Strength by Inverse Methods, Part II, Experimental Investigation of Methods for Choosing Regularization Parameters," J. Sound Vib., vol. 233, pp. 669-705 (2000).

Philips et al., Digital Control System Analysis and Design, Prentice-Hall Inc., pp. 54-61 (1998).

Bai et al., "Kalman Filter-Based Microphone Array Signal Processing Using the Equivalent Source Model," J. Sound Vib., vol. 331, pp. 4940-4955 (2012).

\* cited by examiner

METHOD OF USING MICROPHONES TO MEASURE PARTICLE VELOCITY

FIELD OF THE INVENTION

The present invention relates to a particle velocity measurement technology, particularly to a method of using microphones to measure a particle velocity.

BACKGROUND OF THE INVENTION

Microphones play an important role in the occasions where sounds need picking up, such as concerts, awarding ceremonies, and sport game broadcasts. In order to achieve the optimized sound pickup quality, professional microphones are normally used in such occasions. The acoustic pressure of sounds originates from the particle velocity. Therefore, purer acoustic signals will be obtained if we directly measure the particle velocity rather than indirectly measure the acoustic pressure.

H. E. de Bree disclosed a particle velocity-based microphone in a paper "The Microflown: an acoustic particle velocity sensor, Acoustics Australia Vol. 31, December (2003) No. 3, pp. 91-94", wherein a platinum sensor is used to detect a particle velocity, and a thermal flow algorithm is used to process the particle velocity. The prior-art microphone can precisely pick up sounds. However, it is very expensive.

E. Kreyszig disclosed an acoustic pressure microphone system in a book "Advanced Engineering Mathematics (John Wiley & Sons, Inc., New York, 2006), pp. 798-801", wherein microphone pairs are used to approximate the acoustic pressure gradient in a finite-differential way to obtain the particle velocity. However, the sound signals are likely to be distorted by noise and the mismatch of microphones.

Therefore, it is expected to develop a method of using common and inexpensive sensors to precisely measure the particle velocity.

SUMMARY OF THE INVENTION

The primary objective of the present invention is to overcome the problems of the conventional particle velocity-based microphone system, such as the high price resulting from expensive sensors, and distortion caused by mismatch of microphones.

To achieve the above-mentioned objective, the present invention proposes a method of using microphones to measure a particle velocity, which comprises the steps of:

Step A: arranging a sound source, a first microphone and a second microphone in a space, wherein the first microphone is arranged between the sound source and the second microphone, and wherein the first microphone is located at a first position and the second microphone is located at a second position which is more far away from the sound source than the first position;

Step B: using the first microphone to measure the sound source and obtain a first acoustic pressure, and using the second microphone to measure the sound source and obtain a second acoustic pressure;

Step C: using an equivalent source method and the first and second positions with respect to the position of the sound source in the space to establish a free-space Green's function, and using the equivalent source method and the first and second acoustic pressures with respect to the positions of the first and second microphones in the space to establish an acoustic pressure function; and Step D: using the free-space Green's function and the acoustic pressure function to predict state space of the sound amplitude and then obtain a particle velocity.

The present invention uses the first microphone and the second microphone to predict the state space of the sound amplitude and then precisely obtain the particle velocity. As the first and second microphones can be realized by common MEMS (micro-electromechanical system) microphones, the present invention also has the advantage of low cost.

DETAILED DESCRIPTION OF THE PREFERRED EMBODIMENTS

The technical contents of the present invention are described in detail in cooperation with drawings below.

Figure 1A:
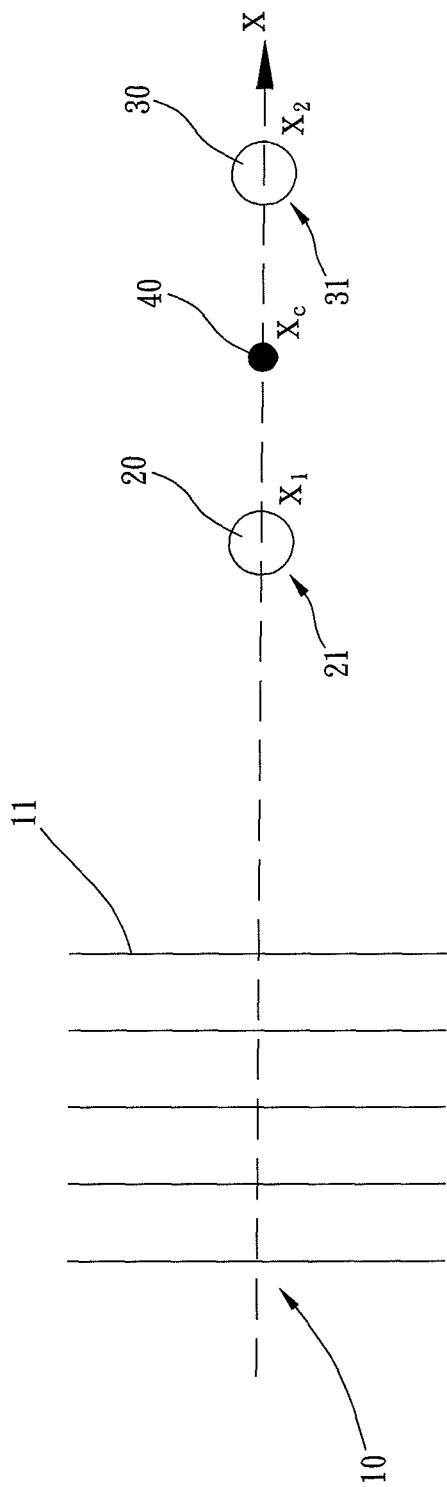
FIG. 1A schematically shows that a sound source emits planar waves according to one embodiment of the present invention.
Figure 1B:
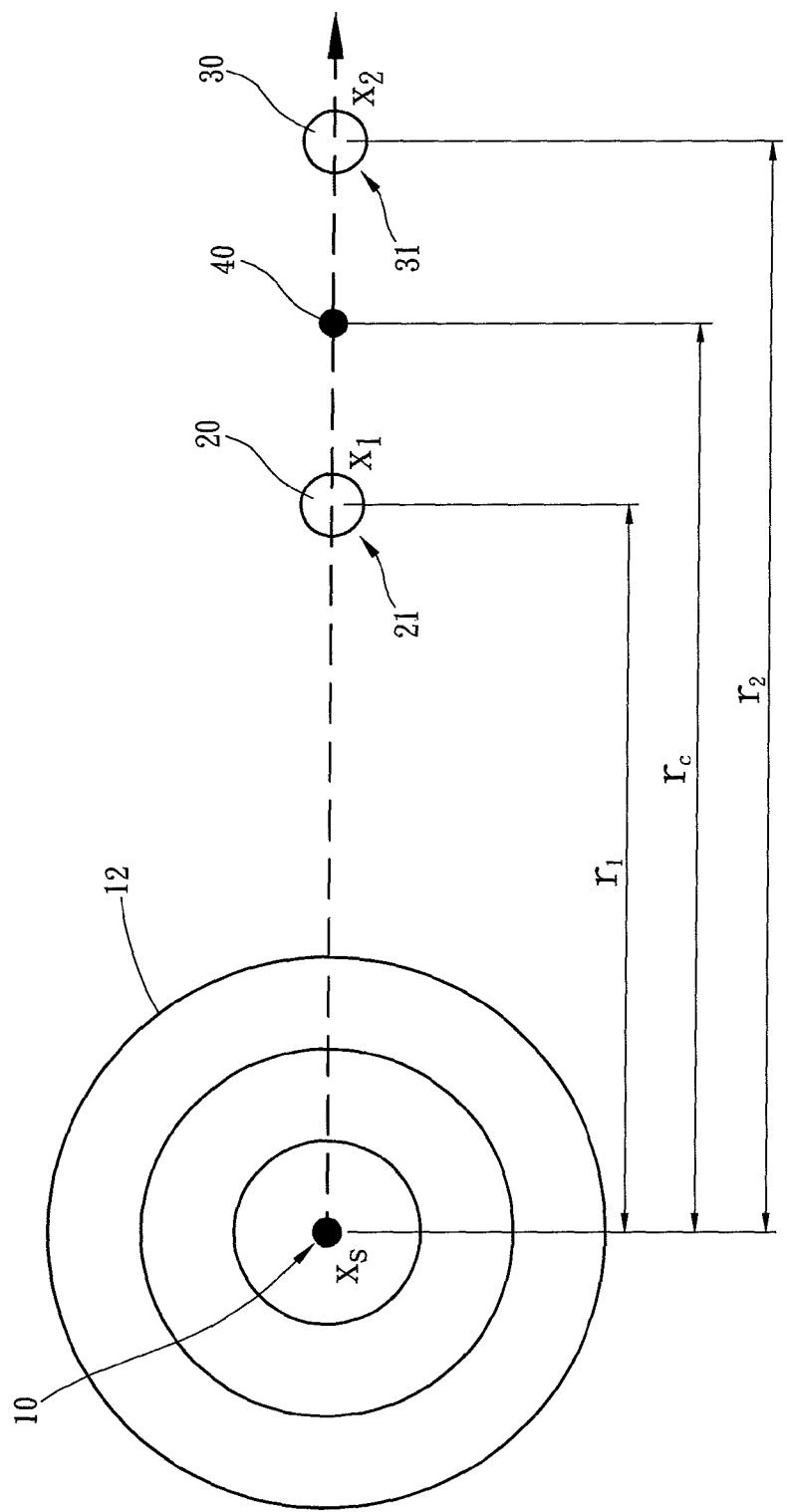
FIG. 1B schematically shows that a sound source emits spherical waves according to one embodiment of the present invention.

Refer to FIG. 1A and FIG. 1B. FIG. 1A schematically shows that a sound source emits planar waves according to one embodiment of the present invention. FIG. 1B schematically shows that a sound source emits spherical waves according to one embodiment of the present invention. The present invention proposes a method of using microphones to measure a particle velocity. The method of the present invention comprises the following steps.

Step A: arranging a sound source 10, a first microphone 20 and a second microphone 30 in a space. The sound source 10 is a planar sound source to emit planar waves (as shown in FIG. 1A) or a spherical sound source to emit spherical waves (as shown in FIG. 1B). The first microphone 20 is located at a first position 21, and the second microphone 30 is located at a second position 31. The first microphone 20 is arranged between the sound source 10 and the second microphone 30. Thus, the second position 31 is more far away from the sound source 10 than the first position 21. In one embodiment, the first and second microphones 20 and 30 are MEMS (micro-electromechanical system) microphones.

Step B: using the first microphone 20 to measure the sound source 10 and obtain a first acoustic pressure, and using the second microphone 30 to measure the sound source 10 and obtain a second acoustic pressure.

Step C: using an equivalent source method and the first and second positions 21 and 31 with respect to the position of the sound source 10 in the space to establish a free-space Green's function, and using the equivalent source method and the first and second acoustic pressures with respect to the positions of the first and second microphones 20 and 30 in the space to establish an acoustic pressure function. For the details of the equivalent source method, please refer to the following papers: A. Sarkissian, "Method of superposition applied to patch near-field acoustical holography", J. Acoust. Soc. Am. 118, 671-678 (2005); J. Gomes, J. Hald, P. Juhl, and F. Jacobsen, "On the applicability of the spherical wave expansion with a single origin for near-field acoustical holography", J. Acoust. Soc. Am. 125, 1529-1537 (2009); P. A. Nelson and S. H. Yoon, "Estimation of acoustic source strength by inverse methods: part I, conditioning of the inverse problem", J. Sound Vib. 233, 643-668 (2000); and P. A. Nelson and S. H. Yoon, "Estimation of acoustic source strength by inverse methods: part II, experimental investigation of methods for choosing regularization parameters", J. Sound Vib. 233, 669-705 (2000). The methods described in the above-mentioned papers are incorporated into the present invention and regarded as a part of the present invention.

In the case that the sound source 10 emits planar waves, the free-space Green's function is a planar equation expressed by $$G_{pl}(\omega) = \begin{bmatrix} e^{-jkx_1} \\ e^{-jkx_2} \end{bmatrix} \quad (1)$$

wherein $k=\omega/c$ is a wave function, $\omega$ is an angular frequency, c is the sound velocity, $x_1$ is the coordinate of the first position 21, and $x_2$ is the coordinate of the second position 31. The acoustic pressure function is expressed by $$p_h(x_m,\omega)=a(\omega)e^{-jkx_m} \quad (2)$$

wherein when m=1, $x_1$ is the coordinate of the first position 21, and wherein when m=2, $x_2$ is the coordinate of the second position 31, and wherein $a(\omega)$ is the unknown sound amplitude of the planar wave 11.

In the case that the sound source 10 emits spherical waves, the free-space Green's function is a spherical equation expressed by $$G(x_m, x_s) = \frac{j\rho_0 \omega e^{-jkr_m}}{4\pi r_m} \quad (3)$$

wherein when m=1, $x_1$ is the position vector of the first position 21, and wherein when m=2, $x_2$ is the position vector of the second position 31. Thus $x_s$ is the position vector of the sound source 10. And wherein $r_m=//x_m-x_s//$, $r_1$ is the distance between the first position 21 and the sound source 10, and $r_2$ is the distance between the second position 31 and the sound source 10. And wherein $\rho_0$ is the central mass density. The acoustic pressure function is expressed by $$p_h(x_m,\omega)=q(\omega)G(x_m,x_s) \quad (4)$$

wherein $q(\omega)$ is the unknown source strength of the spherical wave 12. In the above-mentioned embodiment, the first acoustic pressure and the second acoustic pressure are expressed by the frequency domain. Thus, the free-space Green's function and the acoustic pressure function are frequency domain-based equations. However, this is not the limitation of the present invention, the invention also allows time domain-based equations.

Step D: using the free-space Green's function and the acoustic pressure function to predict state space of the sound amplitude and then obtain a particle velocity. For the state space prediction, please refer to a paper "C. L. Philips and H. T. Nagle, Digital Control System Analysis and Design (Prentice-Hall, Inc., Upper Saddle River, 1998), pp. 54-61". The method described in the above-mentioned paper is incorporated into the present invention and regarded as a part of the present invention. The state space prediction of the sound amplitude involves a process equation and a measurement equation.

In the case that the sound source 10 emits planar waves, the process equation is expressed by $$a(n+1)=a(n)+v_1(n) \quad (5)$$

wherein $v_1(n)$ is a process noise vector, and n is a frame index dealing with acoustic problem in the frequency domain. The measurement equation is expressed by $$p_h(n)=G_{pl}a(n)+v_2(n) \quad (6)$$

wherein $v_2(n)$ is a measurement noise vector.

In the case that the sound source 10 emits spherical waves, the process equation is expressed by $$q(n|1)=q(n)|v_1(n) \quad (7),$$

and the measurement equation is expressed by $$p_h(n)=G_{sp}q(n)+v_2(n) \quad (8)$$

Step D further comprises Step D1 and Step D2.

Step D1: using an algorithm to obtain a sound amplitude parameter from the process equation and the measurement equation. In this embodiment, in the case that the sound source 10 emits planar waves 11, the sound amplitude parameter is the sound amplitude of the planar wave 11 $a(\omega)$. In the case that the sound source 10 emits spherical waves, the sound amplitude parameter is the sound amplitude of the spherical wave 12 $q(\omega)$. In one embodiment, the algorithm is a Kalman filter. For the method to solve the Kalman filter, please refer to a paper "M. R. Bai and C. C. Chen, "Kalman filter-based microphone array signal processing using the equivalent source model", J. Sound Vib. (2012), pp. 4940-4955". The method described in the above-mentioned paper is incorporated into the present invention and regarded as a part of the present invention. Thus, the sound amplitude parameter is solved to obtain the sound amplitude of the planar wave 11 $a(\omega)$ or the sound amplitude of the spherical wave 12 $q(\omega)$.

Step D2: working out a particle velocity from the sound amplitude parameter and the acoustic pressure function according to the method described below.

In the case that the sound source 10 emits planar waves 11, the particle velocity $u(\omega)$ in the frequency domain can be obtained from the equations:

$$p(\omega) = a(\omega)e^{-jkx_c} \quad (9)$$

$$u(\omega) = \frac{1}{\rho_0^c} a(\omega) e^{-jkx_c} = \frac{p(\omega)}{\rho_0^c} \quad (10)$$

wherein $x_c$ is the coordinate of a central position 40 between the first position 21 and the second position 31.

In the case that the sound source 10 emits spherical waves, the particle velocity $u(\omega)$ in the frequency domain can be obtained from the equations:

$$p(\omega) = j\rho_0 \omega q(\omega) \frac{e^{-jkr_c}}{4\pi r_c} \quad (11)$$

$$u(\omega) = q(\omega)\left(\frac{1}{r} + jk\right)\frac{e^{-jkr_c}}{4\pi r_c} = \left(1 - \frac{j}{kr}\right)\frac{p(\omega)}{\rho_0^c} \quad (12)$$

wherein $r_c$ is the distance between the sound source 10 and a central position 40 which is between the first position 21 and the second position 31, and wherein r is the distance between the sound source 10 and a central point of an array between the first position 21 and the second position 31. In this embodiment, r is $r_c$.

It should be noted that an instantaneous acoustic intensity can be further obtained via transforming the obtained particle velocity and the acoustic pressure function from the frequency domain to the time domain according to an equation I(t)=p(t)u(t).

Figure 2A:
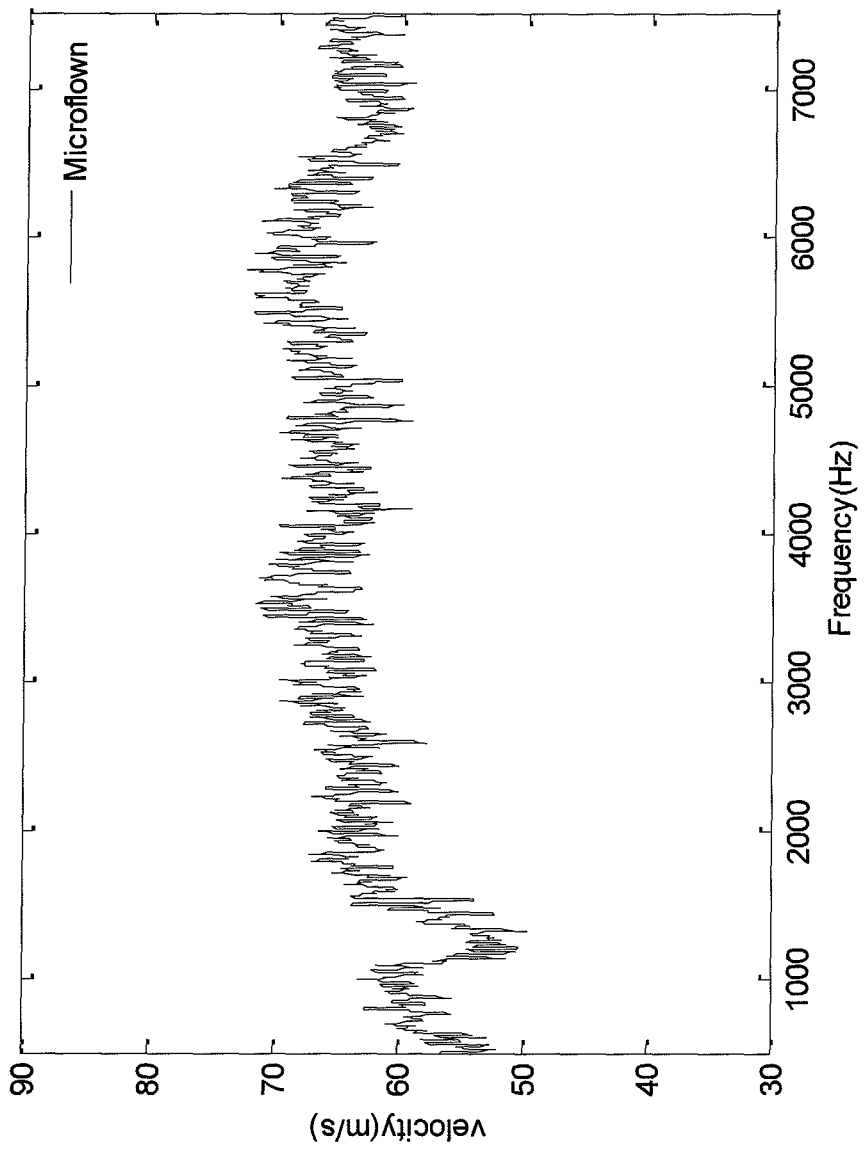
FIG. 2A shows the particle velocity obtained by the conventional technology involving the platinum sensor and the thermal flow algorithm.
Figure 2B:
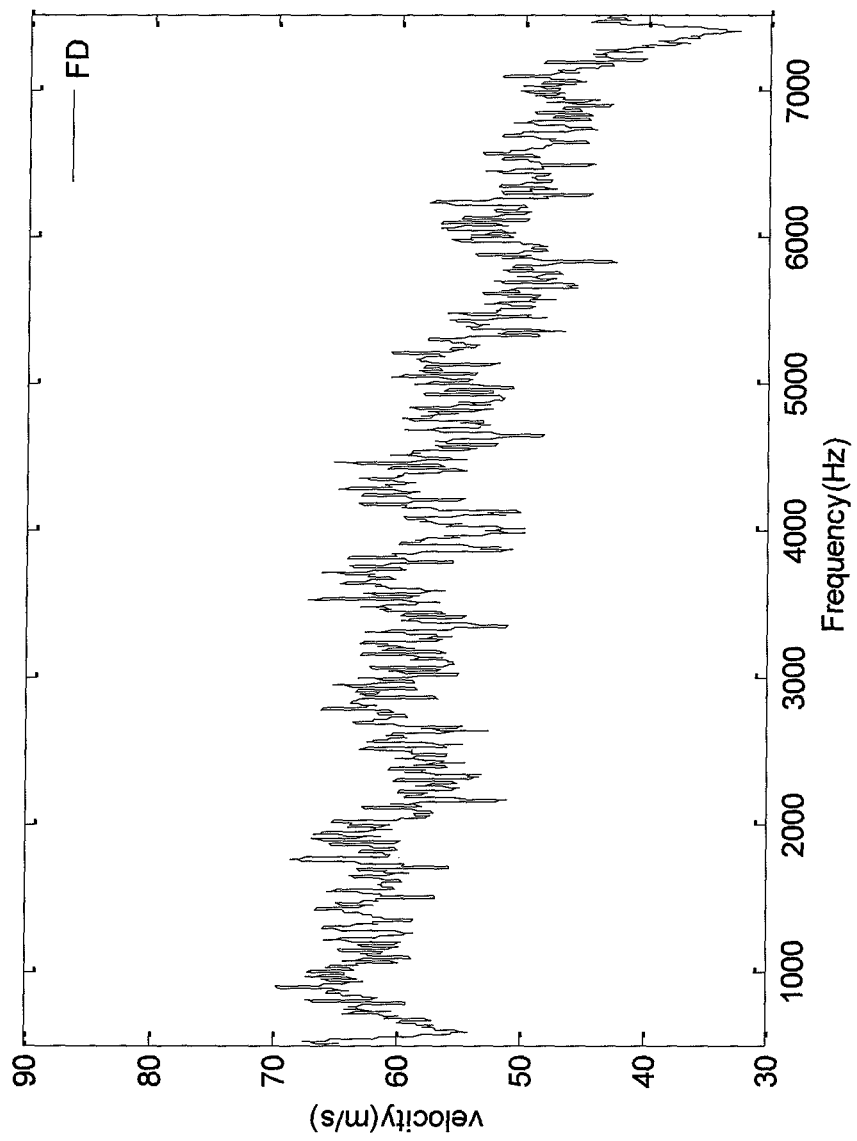
FIG. 2B shows the particle velocity obtained by the conventional definite differential method.
Figure 2C:
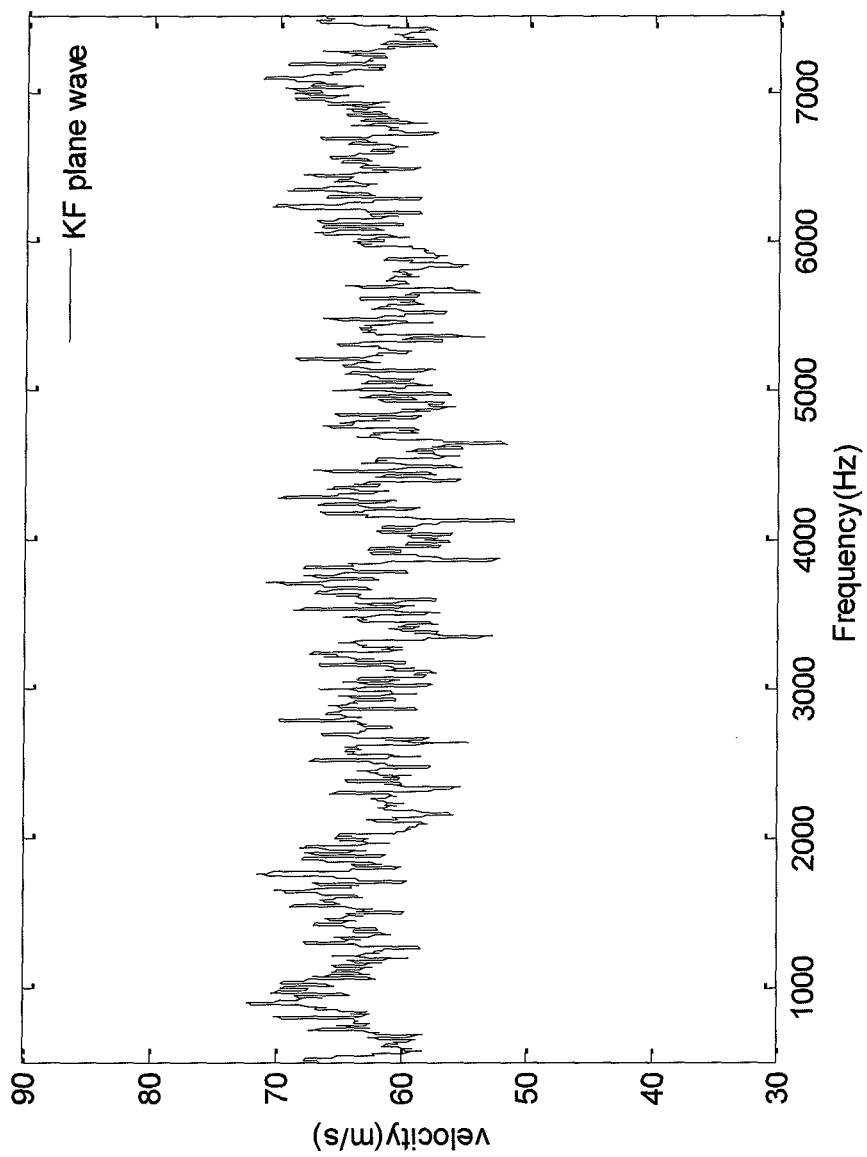
FIG. 2C shows the particle velocity of a planar wave, which is obtained by the Kalman filter according to one embodiment of the present invention.
Figure 2D:
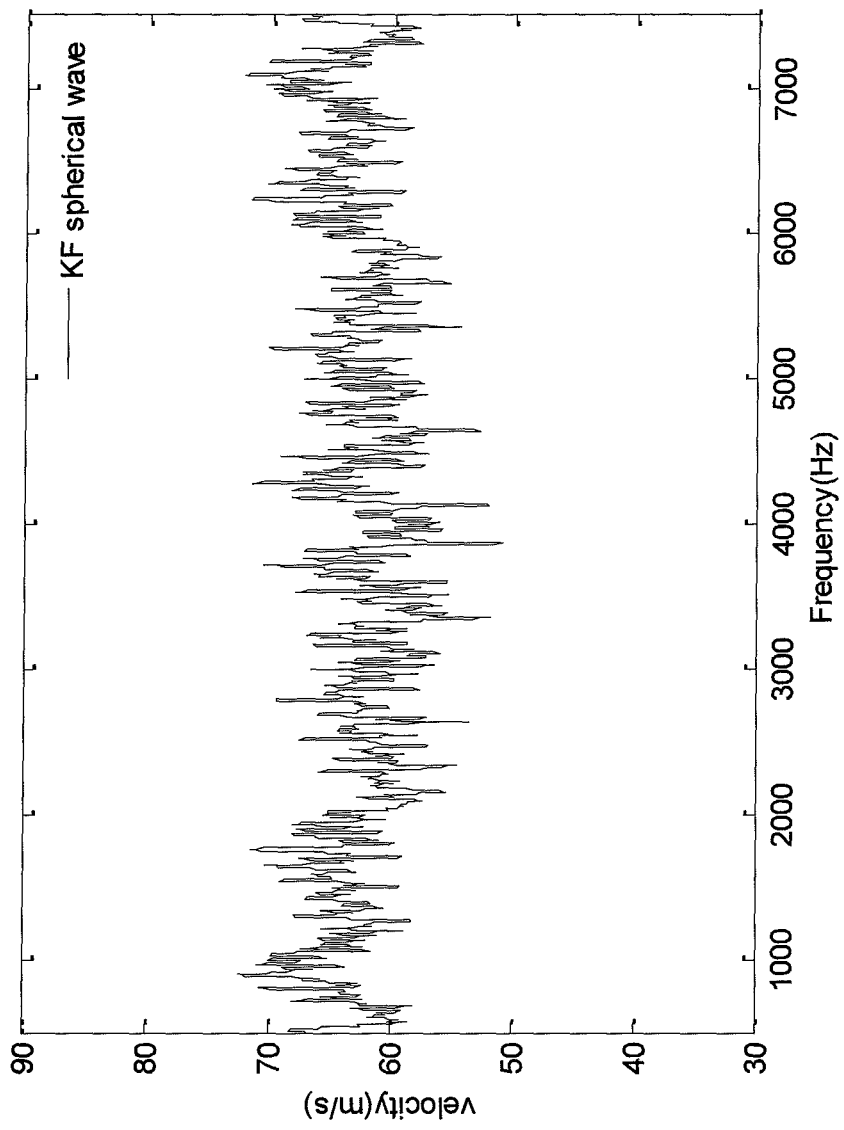
FIG. 2D shows the particle velocity of a spherical wave, which is obtained by the Kalman filter according to one embodiment of the present invention.

Refer to FIGS. 2A-2D diagrams for comparing the particle velocities obtained by the conventional technologies and by the present invention, wherein the horizontal axis denotes frequency and the vertical axis denotes the particle velocity. FIG. 2A shows the particle velocity obtained by the conventional technology involving the platinum sensor and the thermal flow algorithm. FIG. 2B shows the particle velocity obtained by the conventional definite differential method. FIG. 2C shows the particle velocity of a planar wave 11, which is obtained by the Kalman filter according to one embodiment of the present invention. FIG. 2D shows the particle velocity of a spherical wave 12, which is obtained by the Kalman filter according to one embodiment of the present invention. From FIGS. 2A-2D are observed that the particle velocities of the planar wave 11 and the spherical wave 12 are close to the particle velocity obtained by the thermal flow algorithm and that there is obvious difference between the particle velocities obtained by the present invention and the particle velocity obtained by the definite differential method while the frequency exceeds 5000 Hz. Therefore, the present invention is more precise than the definite differential method.

In conclusion, the present invention arranges two MEMS microphones as the first microphone and the second microphone to predict the state space of sound amplitude and obtain the particle velocity. The present invention is more precise than the conventional definite differential method and is less expensive than the conventional technology involving the platinum sensor and the thermal flow algorithm. Therefore, the present invention possesses utility, novelty and non-obviousness and meets the condition for a patent. Thus, the Inventors file the application for a patent. It is appreciated if the patent is approved fast.

The present invention has been described in detail with the embodiments. However, these embodiments are only to exemplify the present invention. They are not intended to limit the scope of the present invention. Any equivalent modification or variation according to the spirit of the present invention is to be also included within the scope of the present invention.

What is claimed is:

1. A method of using microphones to measure a particle velocity, comprising the steps of:
    Step A: arranging a sound source, a first microphone and a second microphone in a space, wherein the first microphone is arranged between the sound source and the second microphone, and wherein the first microphone is located at a first position and the second microphone is located at a second position which is more far away from the sound source than the first position;
    Step B: using the first microphone to measure the sound source and obtain a first acoustic pressure, and using the second microphone to measure the sound source and obtain a second acoustic pressure;
    Step C: using an equivalent source method, and the first position and the second position with respect to a position of the sound source in the space to establish a free-space Green's function, and using the equivalent source method, and the first acoustic pressure and the second acoustic pressure with respect to positions of the first and second microphones in the space to establish an acoustic pressure function; and
    Step D: using the free-space Green's function and the acoustic pressure function to predict a state space of sound amplitude and then obtain a particle velocity.

2. The method of using microphones to measure a particle velocity according to claim 1, wherein the sound source emits spherical waves, and wherein the free-space Green's function is a spherical equation.

3. The method of using microphones to measure a particle velocity according to claim 1, wherein the sound source emits planar waves, and wherein the free-space Green's function is a planar equation.

4. The method of using microphones to measure a particle velocity according to claim 1, wherein the state space prediction of the sound amplitude involves a process equation and a measurement equation, and wherein Step D further comprises the steps of:
    Step D1: using an algorithm to obtain a sound amplitude parameter from the process equation and the measurement equation; and
    Step D2: working out the particle velocity from the sound amplitude parameter and the acoustic pressure function.

5. The method of using microphones to measure a particle velocity according to claim 4, wherein the algorithm is a Kalman filter.

6. The method of using microphones to measure a particle velocity according to claim 1, wherein the free-space Green's function and the acoustic pressure function are frequency domain-based equations.

* * * * *